UNITED STATES PATENT OFFICE.

JOHN PURING, OF NEW YORK, N. Y., ASSIGNOR TO ROBESON PROCESS COMPANY, OF NEW YORK, N. Y., A CORPORATION OF NEW JERSEY.

WOOD-STAIN.

1,185,604. Specification of Letters Patent. Patented May 30, 1916.

No Drawing. Application filed November 19, 1915. Serial No. 62,327.

*To all whom it may concern:*

Be it known that I, JOHN PURING, a citizen of Russia, residing at New York, in the county of New York and State of New York, have invented certain new and useful Improvements in Wood-Stains, of which the following is a specification.

This invention relates to wood stains; and it comprises a preparation suitable for staining and filling wood, for treating leather and for other purposes, comprising an emulsion of concentrated sulfite waste liquor, a drying oil which is advantageously linseed oil and a modicum of a strong acid, which is best sulfuric acid; all as more fully hereinafter set forth and as claimed.

The object of this invention is to produce a new and cheap stain, or preparation for superficially impregnating, filling and decorating wood. The preparation may be used for other like purposes, as in surfacing leather, or paper or papier mâché preparations. To this end, I make an intimate emulsion of concentrated sulfite waste liquor and a drying oil. While other drying oils, such as the nut oils, soy bean oil, tung or wood oil, etc., may be used, I find linseed oil gives me the best preparation. This linseed oil may be the raw oil or it may have been boiled to any extent desired. Linseed oil, or the other drying oils and concentrated waste sulfite liquor however do not emulsify readily and permanently alone. I find that in order to make a preparation of highly desirable quality it is necessary to add a little strong acid, say about half a per cent. of the total mixture.

Sulfite waste liquor is a watery effluent from the process of making paper pulp with the aid of a solution of bisulfite of lime (calcium bisulfite) or of bisulfite of lime and bisulfite of magnesia (calcium bisulfite and magnesium bisulfite). As it comes from the digester, it is a thin watery liquid. By appropriate methods of operation (see Robeson 833634) it may be concentrated to a thick, heavy, substantially neutral liquid without much change, if any, in the organic constituents. This preparation is by far the best for the present purposes. Its color as found in commerce is brown or golden brown; a color not much different from that of linseed oil. This golden brown color is therefore usually the color of my composition. This color is a highly desirable one for most purposes in staining wood. If however a different color be desired, various dyes may be dissolved in the mixture. It may, for instance be darkened to any degree desirable by the solution therein of deep blue anilin dyes. If water soluble dyes are used they should be first dissolved in the sulfite liquor, that is prior to emulsification. Oil soluble dyes may be dissolved in the drying oil. Colored pigments may of course be incorporated with the emulsion.

A good composition for my purposes may be obtained by taking about 60 per cent. by weight of commercial concentrated sulfite waste liquor which is best of the type of that just described together with, say, 39.5 per cent. of good linseed oil and 0.5 per cent. commercial strong sulfuric acid. The oil and the concentrated sulfite liquor are first emulsified together by shaking or agitation and then the sulfuric acid added. The sulfuric acid has a, so to speak, gelatinizing effect upon the sulfite waste liquor and a similar effect on the oil and these effects conduce to the permanence of the emulsion formed. The bases naturally present prevent any injurious action of the sulfuric acid upon the composition or upon the wood, etc., to which it is subsequently applied. Other mineral acids, such as hydrochloric acid, may be used but are not as advantageous as the sulfuric acid. If a little formaldehyde is added to the composition after emulsification its properties may be somewhat improved for some purposes; and notably where the composition is to be used for wood preservation and for treating leather preparations. With an addition of formaldehyde, the composition acquires a greasy feel and works somewhat more easily under the brush. Its penetrating powers and its resistance to water are also somewhat improved. Additions of formaldehyde should be made after emulsification of the oil, sulfite liquor and acid.

What I claim is:—

1. As a filling and coloring composition, an emulsion comprising concentrated waste sulfite liquor, a drying oil and a modicum of a strong mineral acid.

2. As a filling and coloring composition, an emulsion comprising concentrated waste sulfite liquor, drying oil and sulfuric acid.

3. As a filling and coloring composition, an emulsion comprising concentrated sulfite waste liquor, linseed oil and a modicum of sulfuric acid.

4. A filling and coloring composition containing mutually emulsified oil, sulfite waste liquor, sulfuric acid and formaldehyde.

In testimony whereof, I affix my signature.

JOHN PURING.